US 8,537,669 B2

(12) United States Patent
Sharma et al.

(10) Patent No.: US 8,537,669 B2
(45) Date of Patent: Sep. 17, 2013

(54) PRIORITY QUEUE LEVEL OPTIMIZATION FOR A NETWORK FLOW

(75) Inventors: Puneet Sharma, Palo Alto, CA (US); Wonho Kim, Princeton, NJ (US); Jung Gun Lee, Palo Alto, CA (US); Sung-Ju Lee, San Francisco, CA (US); Jean Tourrilhes, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 330 days.

(21) Appl. No.: 12/768,723

(22) Filed: Apr. 27, 2010

(65) Prior Publication Data
US 2011/0261688 A1 Oct. 27, 2011

(51) Int. Cl.
H04L 12/26 (2006.01)

(52) U.S. Cl.
USPC ............................ 370/230; 370/235; 709/201

(58) Field of Classification Search
USPC .................................. 370/230, 235; 709/201
See application file for complete search history.

(56) References Cited

U.S. PATENT DOCUMENTS

| 6,021,115 | A | * | 2/2000 | Simpson et al. ............... 370/235 |
| 6,611,522 | B1 | | 8/2003 | Zheng et al. |
| 6,771,706 | B2 | | 8/2004 | Ling et al. |
| 7,020,110 | B2 | | 3/2006 | Walton |
| 7,072,413 | B2 | | 7/2006 | Walton et al. |
| 7,177,369 | B2 | | 2/2007 | Crilly, Jr. |
| 7,450,508 | B2 | | 11/2008 | Cha et al. |
| 7,535,969 | B2 | | 5/2009 | Catreux et al. |
| 2002/0075882 | A1 | * | 6/2002 | Donis et al. ..................... 370/412 |
| 2002/0141427 | A1 | * | 10/2002 | McAlpine ..................... 370/413 |
| 2003/0048856 | A1 | | 3/2003 | Ketchum et al. |
| 2003/0236904 | A1 | | 12/2003 | Walpole et al. |
| 2004/0151197 | A1 | | 8/2004 | Hui |
| 2004/0192218 | A1 | | 9/2004 | Oprea |
| 2007/0067476 | A1 | | 3/2007 | Karhinen et al. |
| 2007/0118636 | A1 | | 5/2007 | Yang et al. |
| 2007/0189293 | A1 | | 8/2007 | Yamada et al. |
| 2008/0219279 | A1 | | 9/2008 | Chew |
| 2009/0059786 | A1 | | 3/2009 | Budampati et al. |
| 2009/0161684 | A1 | * | 6/2009 | Voruganti et al. ............. 370/412 |
| 2009/0312045 | A1 | | 12/2009 | Miller et al. |
| 2010/0014540 | A1 | | 1/2010 | Brocke et al. |
| 2010/0046368 | A1 | | 2/2010 | Kaempfer et al. |
| 2010/0074187 | A1 | | 3/2010 | Sun et al. |
| 2010/0118883 | A1 | * | 5/2010 | Jones et al. .................... 370/412 |
| 2011/0261831 | A1 | * | 10/2011 | Sharma et al. ................. 370/412 |

FOREIGN PATENT DOCUMENTS

WO  WO2010007143 A1  1/2010

OTHER PUBLICATIONS

Jeff Gray et al., "Concern Separation for Adaptive QoS Modeling in Distributed Real-Time Embedded Systems".
Wei K Tsai et al., "MAQ: a. Multiplexed Adaptive Queuing Protocol for QoS Adaptation", IEEE Publication Date: Mar. 17-21, 2002, vol. 1, pp. 307-316.

* cited by examiner

Primary Examiner — Wei Zhao

(57) ABSTRACT

Optimizing priority queue levels for a flow in a network includes determining a path for the flow, determining an optimized priority queue level of the flow at each of a plurality of switches based on a Quality of Service (QoS) requirement of the flow and priority queue levels of one or more existing flows in the network. Information of the optimized priority queue level of the flow is sent to at each of the switches.

19 Claims, 7 Drawing Sheets

PRIORITY QUEUE LEVEL OPTIMIZATION FOR A NETWORK FLOW

RELATED APPLICATION

The present application contains some common subject matter with U.S. patent application Ser. No. 12/768,722, entitled "Dynamic Priority Queue Level Assignment for a Network Flow", filed on Apr. 27, 2010, by Puneet Sharma et al., which is incorporated by reference in its entirety.

BACKGROUND

The scale of computing infrastructure has experienced explosive growth at least partially due to multiple applications being supported on network fabric. For instance, data centers and enterprises commonly support multiple applications on the same infrastructure. The infrastructures typically include one or more networks supporting the traffic of the applications. In most instances, existing networks are designed for best-effort traffic, and they are unable to meet strict and sometimes orthogonal quality-of-service (QoS) requirements, such as high bandwidth and low latency, for certain applications. The networks are over provisioned or there is no mechanism to shield applications from each other.

Two of the most commonly adopted techniques to sustain QoS are network isolation and network over-provisioning. Data center networks, for instance, have isolated networks with specialized hardware and communication protocols for each class of traffic. In some cases, networks are over-provisioned by a large factor of 2.5× to 8× to avoid QoS violations. Both solutions can lead to heavy under-utilization and are not cost effective.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures may not be described in detail to avoid unnecessarily obscuring the description of the embodiments. Also, the embodiments may be used in combination with each other.

According to an embodiment, a QoS controller determines a path for a new flow. A flow comprises an aggregation of packets between a source and a destination in a network. For instance, all hypertext transport protocol (HTTP) packets between two hosts may be defined as a flow. A flow may be a subset of another flow. For example, a specific HTTP connection from the source to the destination can be a subset of all HTTP packets from the source to the destination. In addition, more than one flow can be aggregated and a flow can be disaggregated into multiple flows. A flow may be bidirectional or unidirectional. The path includes a plurality of switches in a network. The QoS controller determines optimized priority queue levels for the new flow at the switches based on a QoS requirement of the new flow and QoS requirements of existing flows at the switches in the network. A QoS requirement is a performance metric that should be met for a flow. Examples of performance metrics may include bandwidth, latency, etc. A QoS requirement may be predetermined based on class of flow, and each class may have one or multiple QoS requirements. Optimized priority queue levels are described in further detail below and include switch-level priorities for a flow to maintain flow QoS requirements. Through implementation of the embodiments, performance of each flow may be preserved even when faced with unexpected events of other flows. Also, diverse QoS requirements of different flow classes may be concurrently satisfied in a single network. The embodiments are generally described with respect to a new flow that is entering the network. However, the embodiments are applicable to any flow, new or existing.

Figure 1:
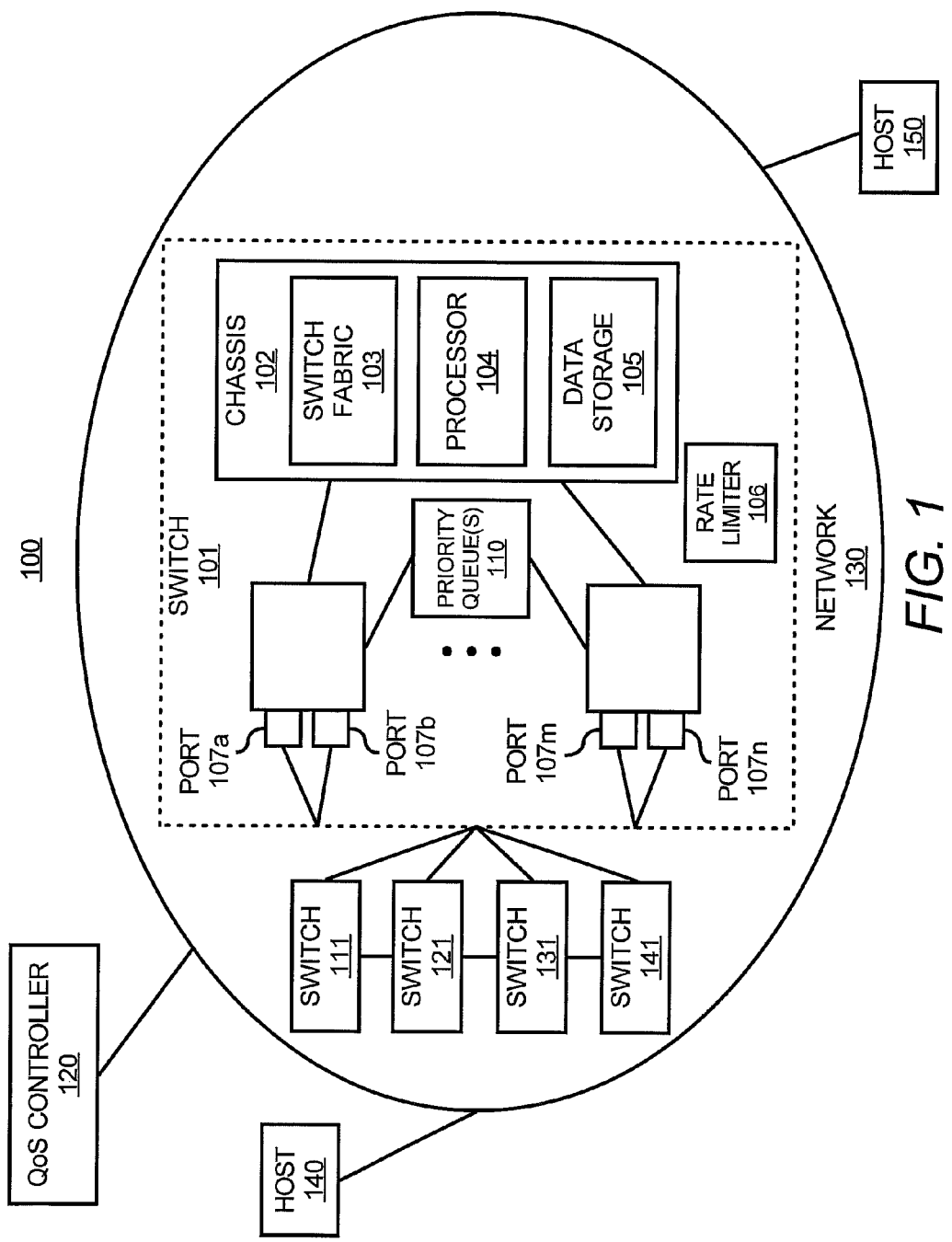
FIG. 1 shows a flow forwarding system, according to an embodiment of the present invention.

FIG. 1 illustrates a flow forwarding system 100, according to an embodiment of the present invention. It should be clearly understood that the system 100 may include additional components and that some of the components described herein may be removed and/or modified without departing from a scope of the system 100. The system 100 includes a switch 101, a switch 111, a switch 121, a switch 131 and a switch 141 in a network 130. The system 100 also includes a QoS controller 120, a host 140 and a host 150. The QoS controller 120 may be a node in the network, such as a server or other computer system, or the QoS controller 120 may be integrated in a network device, such as a switch or a gateway. Although not shown, the QoS controller 120 may be replicated or its function split among multiple QoS controllers throughout the network 130. Additionally, the system 100 may include any number of switches, end hosts, such as the hosts 140 and 150, and other types of network devices, which may include any device that can connect to the network 130. Devices in the network are referred to as nodes, and may include network devices, such as switches, gateways, etc., or computer systems connected to the network, such as servers or end-user devices. Also, the hosts 140 and 150 may include source devices and destination devices.

The switch 101 includes a set of ports 107*a-n*. The ports 107*a-n* are configured to receive and send flows in the network 130. The switch 101 includes one or more queues that may be located in each of the ports 107*a-n*. Priority queue levels are priority levels for different flows in a priority queue of a switch. In each switch, there are multiple priority queues (e.g., priority queues 110). There may be multiple priority queues for each port. Each port, such as the ports 107*a-n*, may have a priority queue level for a flow and different ports among the ports 107*a-n* may have different priority queue levels for different flows. Packets in the higher priority queue levels may be served before the packets in the lower priority queue levels. For example, as packets for each flow are received, they are stored in a priority queue level and then processed for routing towards a destination according to their level. Packets may be stored in a specific priority queue level based on a priority of the flow for the packets. Packets in a higher priority queue level, for example, are processed first for routing. Priority queue levels for a flow at different switches may be determined based on the QoS requirements for the flow that is relative to the QoS requirements for the other flows. The switch 101 also includes a chassis 102. The chassis 102 includes switch fabric 103, a processor 104, and data storage 105. The switch fabric 103 may include a high-speed transmission medium for routing packets between the ports 107a-n internally in the switch 101. The switch 101 may be configured to maximize a portion of packet processing. The processor 104 and the storage 105 may be used for processing, or storing data. The switch 101 further includes a rate limiter 106 and the rate limiter 106 may limit the amount of flow traffic entered into the network 130 from source devices, such as the host 140 or the host 150.

The QoS controller 120 is configured to determine local rules for the switches 101-141 based on loads derived from measurements received from switches in the network 130 and based on global policies and network topology. The QoS controller 120 sends the local rules to the switch 101 over the network 130.

The QoS controller 120 also provides a global set of rules for the network 130. For instance, an administrator may enter the global set of rules into the QoS controller 120. The QoS controller 120 thereafter maintains global policies using the global set of rules for the network 130. The global rules may be based on quality of service (QoS) and performance goals. The QoS controller 120 determines a current load on the switches in the network 130, for example, based on metric reports from nodes in the network 130. The QoS controller 120 also maintains a current topology of the network 130 through communication with the switch 101 and other nodes in the network 130. Then, the QoS controller 120 may communicate directly with the new node to receive metric reports and perform other functions.

The QoS controller 120 may use the topology of the network 130 and the load on the network 130 in a feedback control system to direct switches, including the switch 101, to make adjustments to maintain global policies specified in the global rules. For instance, certain flows, as specified by rules provided by the QoS controller 120, through the switch 101 may be rate limited, or a flow may be routed through other switches in the network 130.

In one embodiment, based on local rules received from the QoS controller 120 and stored at the switch 101, the switch 101 may thereafter reliably forward each of the flows using a single path or a multiple paths as defined in the local rules. The QoS controller 120 may asynchronously (i.e., independent of a flow setup request) send an update to the switch 101 to change the local rules at the switch 101. New local rules may be received in an instruction from the QoS controller 120 based on the metric report. For instance, a flow may be rate-limited depending on bit rate through other switches in the network 130. Alternately, the QoS controller 120 may place a timeout or expiration (in terms of seconds) or a limit (in terms of a number of flows) on the switch 101.

Figure 2:
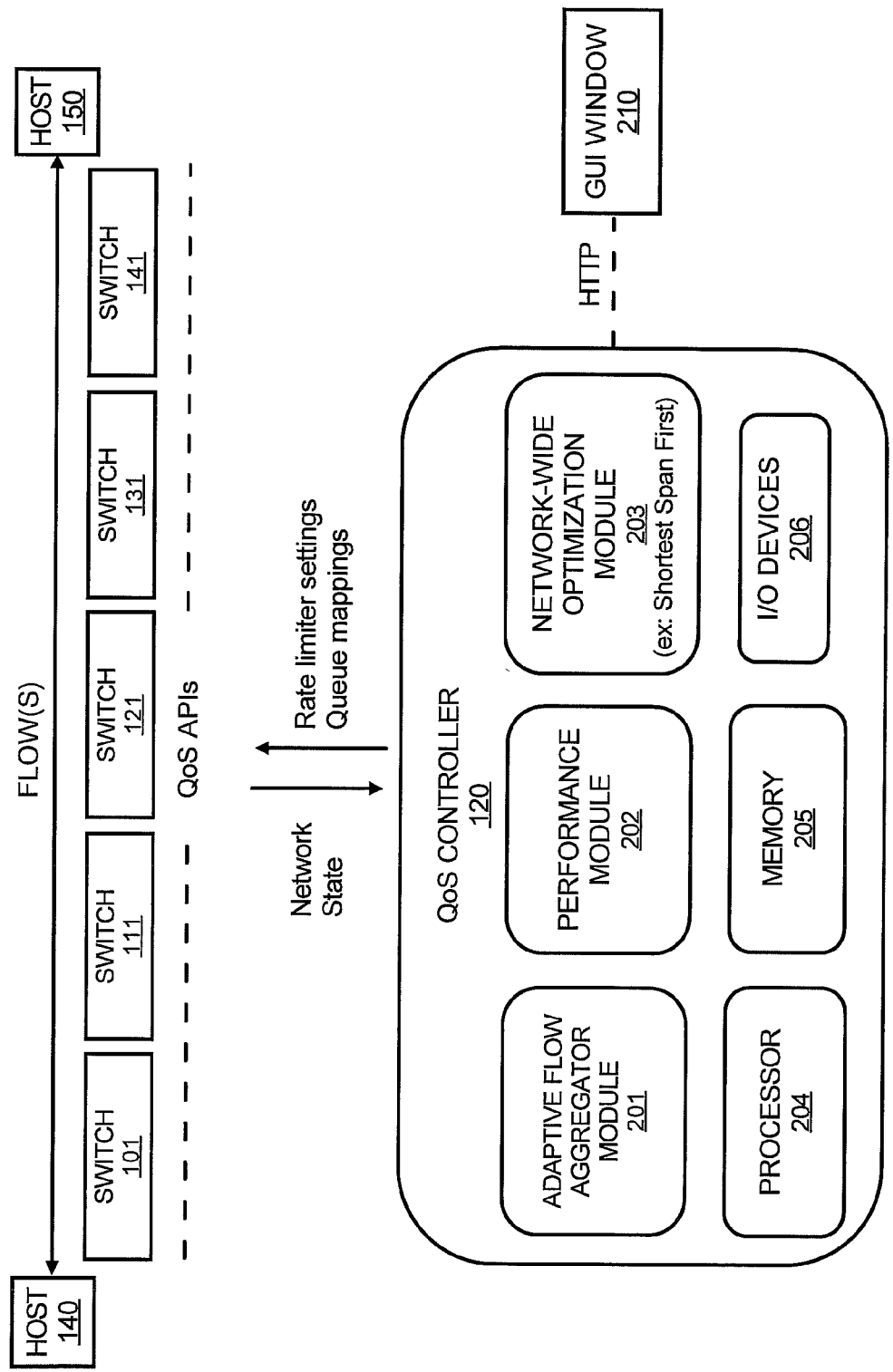
FIG. 2 illustrates a data transmitted between switches and a QoS controller, according to an embodiment of the present invention.

FIG. 2 illustrates data transmitted between switches and the QoS controller 120, according to an embodiment of the present invention. An interface used between the switches 101-141 and the QoS controller 120 in FIG. 2 is QoS application program interfaces (APIs). However, it should be clearly understood that the embodiments are not limited to the QoS APIs. For example, OpenFlow APIs or other routing protocol APIs may be used without departing from a scope of the invention.

The QoS controller 120 includes an adaptive flow aggregator module 201, a performance module 202, a network-wide optimization module 203, a processor 204, memory 205, and I/O devices 206. The modules 201-203 may comprise software modules, hardware modules, or a combination of software and hardware modules. Thus, in one embodiment, one or more of the modules 201-203 comprise circuit components. In another embodiment, one or more of the modules 201-203 comprise software code stored on a computer readable storage medium, which is executable by a processor. Although the adaptive flow aggregator module 201, the performance module 202, and the network-wide optimization module 203 have been depicted as forming an inside component of the QoS controller 120, it should be understood that the adaptive flow aggregator module 201, the performance module 202, and/or the network-wide optimization module 203 may be separate from the QoS controller 120 without departing from a scope of the QoS controller 120.

The QoS controller 120 may also be used to execute one or more computer programs performing the methods, steps and functions described herein. The computer programs are stored in computer storage mediums. The processor 204 provides an execution platform for executing software. The processor 204 is configured to communicate with switches in a network. The processor 204 is configured to determine a path for a new flow, when the path includes the switches 101-141. The QoS controller 120 determines an optimized priority queue level of the new flow at each of the switches based on a QoS requirement of the new flow and priority queue levels of one or more existing flows in the network. An optimized priority queue level of the flow is a priority queue level that is determined based at least on one or more QoS requirements for the flow and may additionally be based on the network state and other information. Network state may include information about topology and performance metrics. The QoS controller 120 sends the optimized priority queue level of the new flow to each of the switches. The optimized priority queue level for the same new flow may be different at different switches. The new flow passes through the switches using the optimized priority queue level for the new flow at each of the switches.

The memory 205 may be a main memory, such as a Random Access Memory (RAM), where software may reside during runtime. The memory 205 may also be a secondary memory. The secondary memory may include, for example, a nonvolatile memory where a copy of software is stored. In one example, the secondary memory also includes ROM (read only memory), EPROM (erasable, programmable ROM), EEPROM (electrically erasable, programmable ROM), and other data storage devices, include hard disks. The main memory or the secondary memory may store the priority queue levels of different flows at different switches. The I/O devices 206 may include a display and/or user interfaces comprising one or more I/O devices, such as a keyboard, a mouse, a stylus, speaker, and the like.

In one embodiment, the QoS controller 120 receives QoS requirements for flows. For example, an administrator may input QoS requirements to the QoS controller 120 using the graphical user interface (GUI) window 210. By way of example, the inputs to the QoS controller 120 include identifications of flows and their QoS requirements, such as bandwidth and delay thresholds. Each flow may be identified through bits in one or more header fields in network packets (e.g., source IP).

In one embodiment, each flow is identified based on flow specifications. Flow specifications may include a set of header fields, but there are wildcard fields to identify multiple flows belonging to a group. Each flow specification may have a reference to slice specifications that specify QoS requirements for the flows in the slice. A slice is a portion of a network used by a flow to send packets. For example, flows having the same or a similar network service, such as a VoIP service or a file download service may share the same slice. The QoS controller 120 may reserve resources for the flow in the slice. In one embodiment, the switch 101 receives the packets at the ports 107*a-n* (as shown in FIG. 1). The switch 101 may determine a flow specification from the packet by extracting certain header fields, and other meta-information, and then looks up the flow in its flow table.

By way of example, a new flow is to be routed from the host 140 to the host 150 via the switches 101-141 in the network 130. The QoS controller 120 determines a QoS requirement for the new flow. The QoS controller 120 derives configuration specifications and sends the derived configuration specifications to the switches 101-141. Each of the switches 101-141 configures the priority queue level based on the received configuration specifications to accommodate the QoS requirement (e.g., bandwidth and delay thresholds) for the new flow. One or more of the switches 101-141 may also configure a rate-limiter based on the received configuration specifications. For example, in FIG. 2, the QoS controller 120 communicates with the switches 101-141 through the QoS APIs (dashed lines) to collect information about network states. The QoS controller 120 builds and maintains information about the current network state and uses this information for deciding QoS configurations in switches 101-141. Examples of the network state information include network topology, active flows, performance metrics, and available resources in each switch. When the new flow comes to the network 130, the QoS controller 120 calculates resource allocation based on the collected information and performance models. Then, the QoS controller 120 sends configuration information for a rate limiter (e.g., rate limiter 106 in FIG. 1) in the ingress edge switch of the new flow, and configures each priority queue level at each switch in the flow path.

In one embodiment, when a new flow arrives, the QoS controller 120 may first apply the adaptive flow aggregator module 201 to the new flow for better scalability, and decides QoS configurations based on the measurement of network state and network-wide optimizations. The resultant configurations may be sent to the switches 101-141 through the QoS APIs, and resources are then reserved to provide the requested performance to the new flow. In one embodiment, the switches 101-141 implement the CEE (Converged Enhanced Ethernet) and DiffServ QoS frameworks, which is internally based on rate limiters and priority queues. The QoS APIs make available hardware switch QoS capability, rate-limiters and priority queues to the QoS controller 120. The QoS APIs are operable to allocate flows flexibly to those rate limiters and priority queues.

Figure 3:
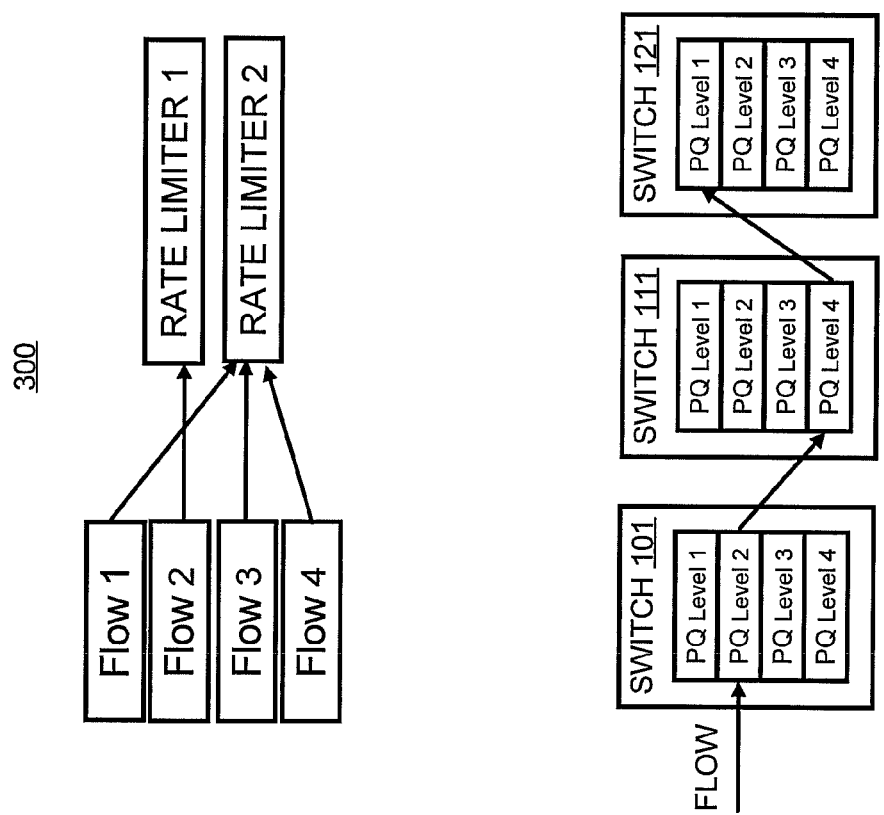
FIG. 3 illustrates a rate limiter and a priority queue mapping, according to an embodiment of the present invention.

FIG. 3 illustrates a rate limiting and priority queue mapping, according to an embodiment of the present invention. Using the priority queue mapping, the QoS controller 120 may map flows to one of the priority queue levels. Placing flows in the higher priority queue levels may increase the flows' throughput and decrease their latency. The QoS controller 120 manages priority queue mapping dynamically across all flows and on a per switch basis to achieve fine grained reactive control.

By using rate limiters, the QoS controller 120 may map an individual flow or a set of flows to one of the rate limiters to enforce aggregate bandwidth usage. In FIG. 3, the QoS controller 120 sets flow 1, flow 2, flow 3, and flow 4 to one of rate limiter 1 and rate limiter 2 to enforce aggregate bandwidth usage. By way of example, flows 1, 3, and 4 are attached to the rate limiter 2 and flow 2 is attached to the rate limiter 1 in FIG. 3. By using the priority queue mapping, the QoS controller 120 may map a flow to one of the priority queue levels in the outgoing port of the switches 101-141, thus managing the bandwidth and delay allocation for the flow at each switch. For example, the QoS controller 120 maps a flow to priority queue level 2 at switch 101, to priority queue level 4 at switch 111, and to priority queue level 1 at switch 121 in FIG. 3. These dynamic mappings are very flexible because the QoS controller 120 can decide the mappings based on the current workload at each switch.

By way of example, when a new flow arrives, the first packet of the flow is delivered to the QoS controller 120. The QoS controller 120 determines a path for the flow. Also, based on the global policy, the QoS controller 120 determines if the flow is a QoS-sensitive flow and its QoS requirements. The QoS controller 120 then computes the resource allocation for the new flow. The output of the QoS controller 120 is the setting of the rate limiters at the edge switches and priority queue levels for the new flow at each switch on the path. These settings are deployed on the switches 101-141 via the QoS APIs.

In one embodiment, the QoS controller 120 stores and keeps the network state information up-to-date with the current state of the network to avoid an inconsistency that can lead to under-utilization of network resources as well as performance violations. The QoS controller 120 combines passive and active monitoring on networks to dynamically update the network state. For passive monitoring, the QoS controller 120 uses packets forwarded to the QoS controller 120. For example, the QoS controller 120 intercepts LLDP and DHCP packets exchanged in networks and updates the network topology accordingly. The QoS controller 120 updates the available resource database when it adds or deletes the QoS configurations in switches 101-141. The QoS controller 120 is configured to query flow tables from switches 101-141 to periodically check and fix any inconsistency. The QoS APIs are also configured to query QoS configurations in switches 101-141 from the QoS controller 120.

Figure 4:
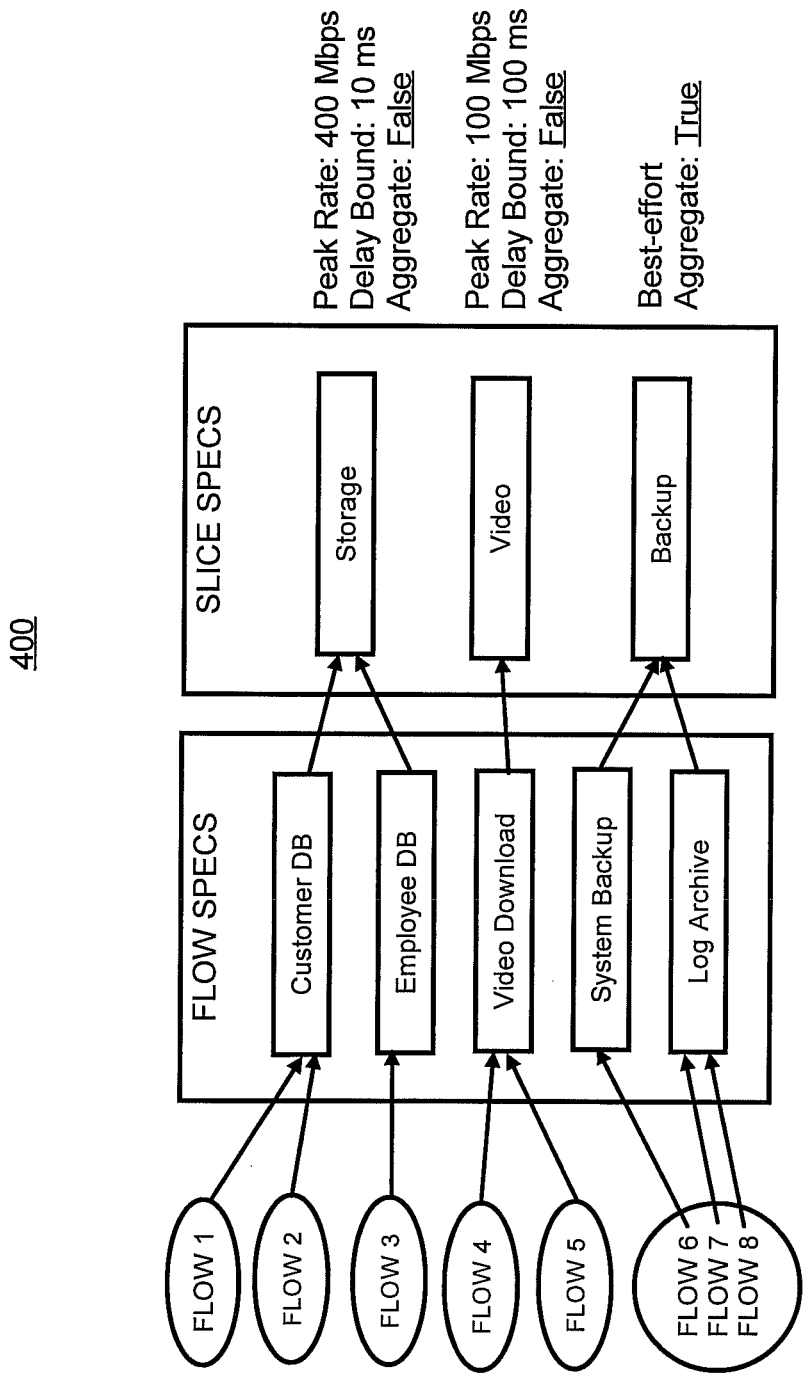
FIG. 4 illustrates a block diagram for an adaptive flow aggregation, according to an embodiment of the present invention.

FIG. 4 illustrates a block diagram 400 for an adaptive flow aggregation, according to an embodiment of the present invention. The adaptive flow aggregation may be performed by the adaptive flow aggregator module 201. It should be clearly understood that the block diagram 400 may include additional components and that some of the components described herein may be removed and/or modified without departing from a scope of the adaptive flow aggregation in the block diagram 400.

In large-scale networks, it may be less efficient for the QoS controller 120 to compute the resource allocation for every single flow and implement QoS actions on switches on a per-flow basis. It would incur large computational and storage overhead on the QoS controller 120 and the switches may end up with a huge amount of flow entries exceeding available TCAM entries and rate-limiters. Thus, in one embodiment, the QoS controller 120 implements the adaptive flow aggregator module 201 that categorizes individual flows into groups, and allocates resources based on the groups.

By way of example, in FIG. 4, ten (10) flows from five services are grouped into three (3) network slices based on slice specification. It should be noted that not every service isolates individual flows of the service. Instead, some services may use aggregated resource reservation for their traffic. In FIG. 4, "Flow Specs" represents a set of flows for each service in network. Types of services depicted in FIG. 4 are customer database (DB), employee DB, video download, system backup, and log archive. The spec is given as a set of header fields with wild-card fields to define the scope of flows belonging to the slice. In FIG. 4, "Slice Specs" shows QoS requirements for a network slice, such as maximum bandwidth, minimum delay, etc. In addition to the QoS requirements, the slice spec also has an aggregate marker field, and if it is true, the QoS controller 120 reserves resources for the aggregate flows in the slice. For example, the QoS controller 120 will configure QoS knobs for all flows from the system backup and log archive services. In one embodiment, once the configuration is done for the first flow, all the following flows may share network resource without contacting the QoS controller 120.

By way of example, flows 1 and 2 have the customer DB flow spec, flow 3 has the employee DB flow spec, flows 4 and 5 have the video download flow spec, flow 6 has the system backup flow spec, and flows 7 and 8 have the log archive flow spec. Further, the customer DB and the employee DB flow specs are related to the storage slice spec, the video download flow spec is related to the video slice spec, and the system backup and the log archive flow specs are related to the backup slice spec. Therefore, flows 1, 2, and 3 are grouped into the storage slice, flows 4 and 5 are grouped into the video slice, and flows 6, 7, and 8 are grouped into the backup slice.

The QoS controller 120 is configured to estimate the performance that a flow will experience in the network 130. The QoS controller 120 is configured to ensure that a new flow will receive its requested performance and the addition of the new flow will not cause QoS requirement violations for existing flows in the network 130 based on a performance model, according to an embodiment of the present invention. The performance model provides the worst case bandwidth and delay for a flow with a given QoS configuration. The performance model is based on the commonly available QoS knobs, such as rate limiters and static priority queue levels.

Figure 5:
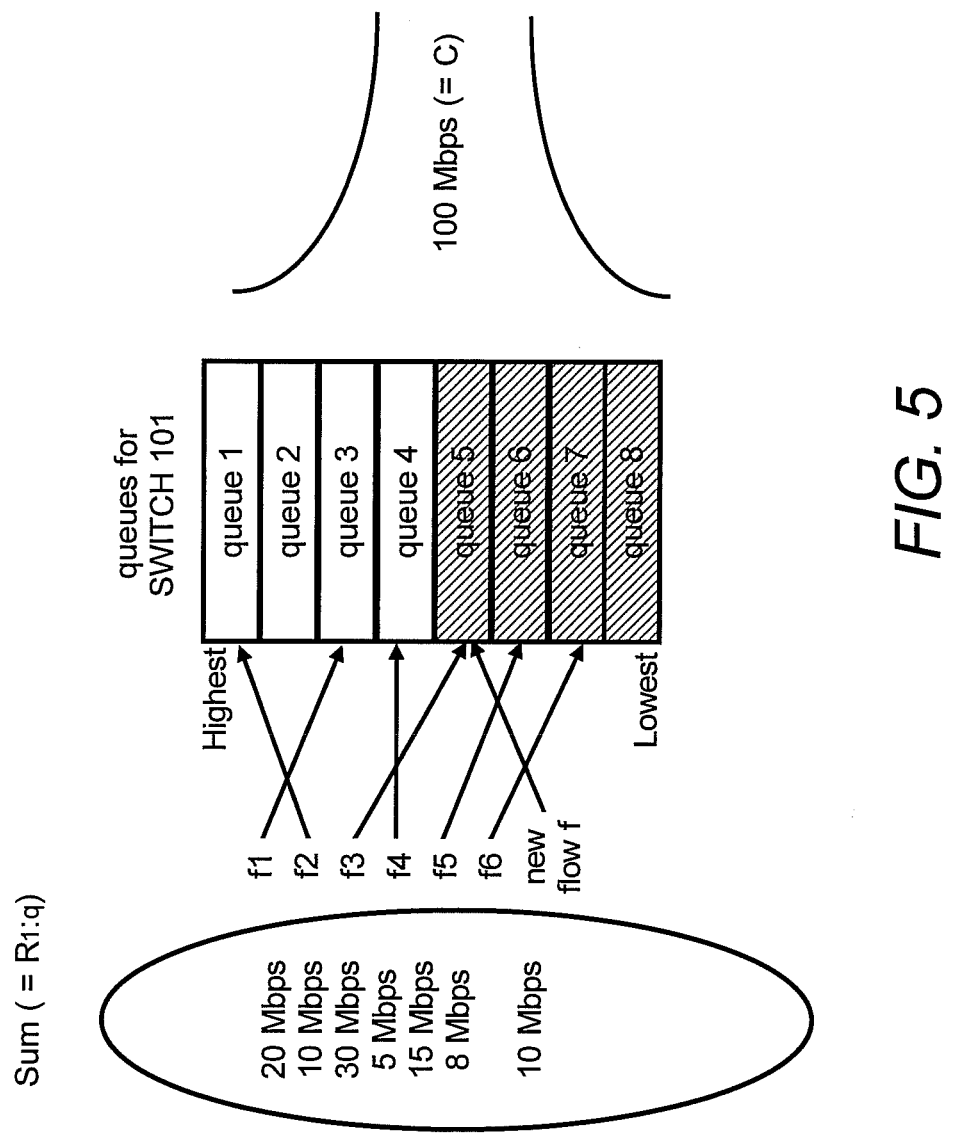
FIG. 5 illustrates a QoS requirement of a flow in a network, according to an embodiment of the present invention.

FIG. 5 illustrates a QoS requirement of a flow in a network, according to an embodiment of the present invention. The QoS requirements include bandwidth and delay requirements denoted by $R_f$ and $D_f$, respectively.

To guarantee the new flow f receives the requested bandwidth $R_f$, the maximum rate of traffic from the other flows in shared links from the new flow paths is checked. The check may include comparing a measured rate of traffic to $C-R_f$, which is calculated for the check. Here, C is a link capacity of the network. Therefore, whether the bandwidth requirement of the new flow on a link in the flows path is met or not may be evaluated by:

$$(C-R_f) > R_2$$

Here, C is a link capacity of the link in the network, $R_f$ is the bandwidth requirement or a specified bandwidth requirement of the new flow on the link in the network, and $R_2$ is bandwidth requirements of the one or more existing flows on the link in the network. The above check for residual capacity after deducting the maximum rate of traffic from the other flows in shared links from the new flow paths may be checked on each link along the path.

With respect to the delay requirement, there are two delays, a specified delay requirement for the new flow and a delay experienced by the new flow at each switch. The specified delay for the new flow may be specific to the new flow and it may be predicted. Evaluating the delay experienced by the new flow at each switch may be more complicated due to consideration of the dependent behavior of priority queue levels. By way of example, a switch output port, such as the ports 107a-n in FIG. 1, with 100 Mbps capacity is depicted in FIG. 5. In FIG. 5, the port has eight (8) static priority queue levels, and six (6) flows, f1, f2, f3, f4, f5, and f6, are mapped to one of the priority queue levels 1-8. By way of example, a new flow f is mapped to the fifth highest priority queue level, queue 5. Then the delay that the new flow f will experience in the fifth queue, $D_f$, may be determined by how fast packets arrive at queues having higher or equal priorities (from queue 1 to queue 5) and how fast the link can drain the packets. Therefore, the delay experienced by the new flow at a particular switch in the network may be a function of:

$$D_f = f(q, R_{1:q}, C)$$

Here, $D_f$ is the delay experienced by the new flow at the switch in the network, f is the new flow, q is a priority queue level of the new flow in the switch, $R_{1:q}$ is a sum of bandwidth requirements of the new flow and the one or more existing flows between priority queue level q and a highest priority queue level of the switch, and C is a link capacity of the outgoing link. The condition to be met is that the sum of the delay experienced at all the switches in the network is less than the specified delay requirement or:

$$\text{Sum}(D_f) < Ds$$

Here, $\text{Sum}(D_f)$ is a total of delays experienced (as computed by the equation in [0042] above) by the new flow at all the switches in the network and Ds is the specified delay requirement for the new flow in the network.

An implication of the delay requirement is that flows in the same port can impact each other in terms of delay bound. For example, in FIG. 5, a delay bound of the new flow f is affected by the flow f1, the flow f2 and the flow f4, and also the delay bound of the new flow f lowers delay bounds for the flow f3, the flow f5, and the flow f6. As a result of adding the new flow f, some flows now have lower delay bounds. Thus, the QoS controller 120 might not be able to find a queue for the new flow f in the next hop if one of the affected flows passes the same hop and its delay bound reaches delay requirement. Thus, the QoS controller 120 considers both the interactions between flows in the same hop and the interactions with flows in the remaining hops to decide queue assignment for a new flow. However, as there can be a large number of flows over multiple hops, it may be computationally expensive to find the optimal queue configuration that satisfies delay requirement of the new flow f while not violating existing flows. It is important to reduce delay in processing new flows for faster flow setup time.

Figure 6:
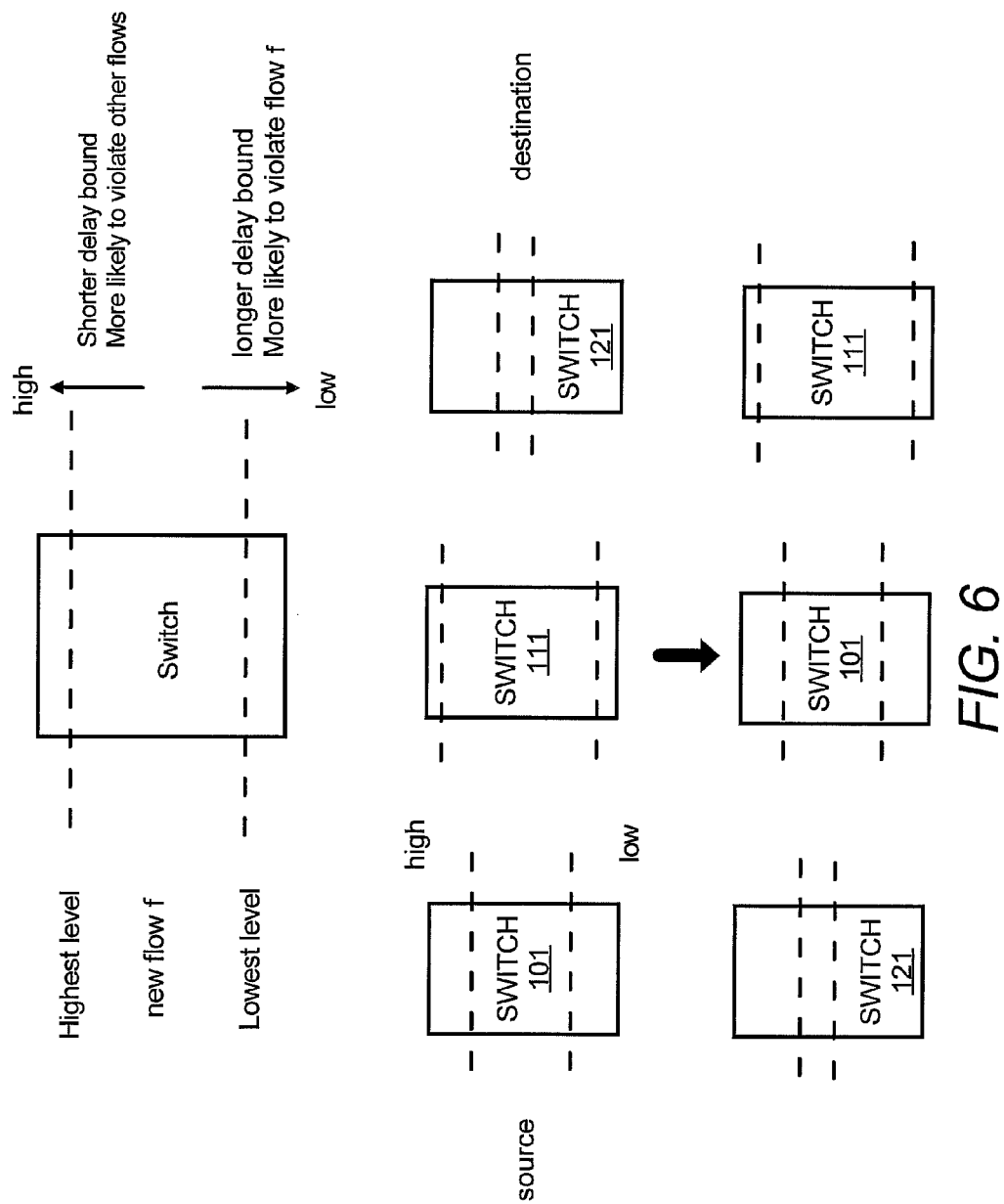
FIG. 6 illustrates a block diagram for a network-wide optimization, according to an embodiment of the present invention.

FIG. 6 illustrates a block diagram for a network-wide optimization, according to an embodiment of the present invention. To maximize the probability of satisfying QoS requirements of a new flow while minimizing the number of rejected flows, a shortest span first (SSF) technique is utilized, according to an embodiment of the present invention. In the SSF, the output is queue assignments in every output port that the new flow f passes. By way of example, given an output port, a queue from q1 to q8 (q1 is the highest priority queue level) (shown in FIG. 5) may be selected for the new flow f. If the new flow f is put into q1, the new flow f will get the shortest delay bound, but negatively affect all the existing flows in the port. Likewise, f will affect a small number of flows but will get high delay bound if the new flow f is put into q8.

As illustrated in FIG. 6, the highest level for the new flow f, which is the highest possible priority queue level not violating the QoS requirements of existing flows, and the lowest level for the new flow f, which is the lowest possible priority queue level not violating the QoS requirements of the new flow f are computed in each switch. Span is a range of levels between the highest level and the lowest level. The span represents the available options for the new flow f in the switch. By way of example, if the new flow f is assigned into a queue in the first switch, then the spans for the other switches may shrink because of the new constraint, and the new flow f may be rejected if a switch in the other switches has zero spans. Therefore, in SSF, the QoS controller 120 is configured to sort switches by the computed spans, to assign the new flow f to the highest level in the first switch, and to re-compute spans for the remaining switch. The QoS controller 120 may repeat the process until there is no remaining port for the new flow f. In one embodiment, the QoS controller 120 is configured to sort switches in the order of increasing span.

For example, in FIG. 6, the switch 111 has the longest span, the switch 121 has the shortest span, and the switch 101 has the mid span among the switches 101, 111, and 121. Therefore, the QoS controller 120 assigns an optimized priority queue level of the new flow f at each of the switches 101, 111, and 121 based on an increasing order of spans of the switches 101, 111, and 121 for the new flow f. Thus, the optimized priority queue level of the new flow f is assigned with the switch 121 first and then the optimized priority queue level of the new flow is assigned with the switch 101, and the optimized priority queue level of the new flow is assigned with the switch 111 last in the increasing order of spans. In one embodiment, the optimized priority queue level of the new flow f is assigned with each of the switches 101, 111, and 121 in the increasing order of spans using the highest priority queue level of the new flow f at each of the switches 101, 111, and 121. The QoS controller might repeat this process for other paths for available for the flow, if the QoS requirements cannot be met by the current path.

Methods in which the system 100 may be employed for dynamically forwarding flows will now be described with respect to the following flow diagram of the method 700 depicted in FIG. 7. It should be apparent to those of ordinary skill in the art that the method 700 represents generalized illustrations and that other steps may be added or existing steps may be removed, modified or rearranged without departing from the scope of the method 700.

The descriptions of the method 700 are made with reference to the system 100 illustrated in FIG. 1, and thus makes reference to the elements cited therein. It should, however, be understood that the method 700 is not limited to the elements set forth in the system 100. Instead, it should be understood that the method 700 may be practiced by a system having a different configuration than that set forth in the system 100.

Figure 7:
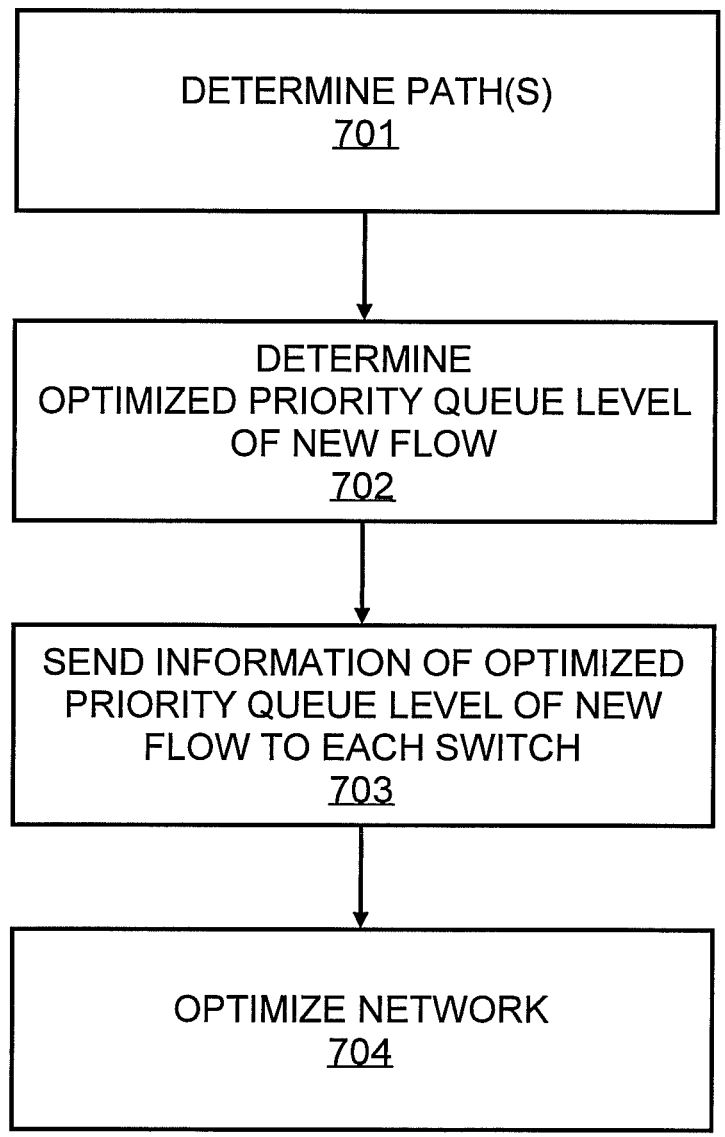
FIG. 7 illustrates a flowchart of a method for optimizing a network for a flow, according to an embodiment of the present invention.

With reference to FIG. 7, there is shown a flowchart of a method 700 for optimizing a network for a flow, according to an embodiment. The method 700 may be performed at the QoS controller 120. The processor 204 in the QoS controller 120 may implement or execute the system 100 to perform one or more of the steps described in the method 700 in optimizing the network 130.

At step 701, the QoS controller 120 determines a path for a new flow. The path includes the plurality of switches, such as the switches 101-141. The flow passes through the plurality of switches 101-141.

At step 702, the QoS controller 120 determines an optimized priority queue level of the new flow at each of the plurality of switches. An optimized priority queue level of the flow is a priority queue level that is determined based at least on one or more QoS requirements for the flow and may additionally be based on the network state and existing flows in the switches in the path. For example, the QoS controller 120 determines the optimized priority queue level of the new flow at each of the plurality of switches based on a QoS requirement of the new flow and priority queue levels of one or more existing flows in the network. For example, once the optimized priority queue level of the new flow at each of the switches 101-141 is determined, the new flow passes through the switches 101-141 using the optimized priority queue level for the new flow at each of the switches 101-141 in the network 130. Here, at least two of the optimized priority queue levels for the new flow at different switches may be different.

At step 703, the QoS controller 120 sends information of the optimized priority queue level of the new flow at each of the switches to each of the switches.

At step 704, the network is optimized when each of the switches are configured based on the information of the optimized priority queue level for the new flow at each of the switches and the path. The switches route the flow using the optimized priority queue level for the flow received from the QoS controller 120.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method of optimizing priority queue levels for a flow in a network, the method comprising:
    determining a path for the flow, wherein the path includes a plurality of switches;
    determining, by a processor, an optimized priority queue level of the flow at each of the plurality of switches based on a Quality of Service (QoS) requirement of the flow and priority queue levels of one or more existing flows in the network, wherein determining the optimized priority queue level of the flow at each of the plurality of switches comprises determining a lowest priority queue level and a highest priority queue level of the flow at each of the plurality of switches, wherein the lowest priority queue level is a lowest priority queue level without violating the QoS requirement of the flow at each of the plurality of switches, and wherein the highest priority queue level is a highest priority queue level without violating QoS requirements of the one or more existing flows at each of the plurality of switches, and wherein the flow passes through the plurality of switches using the optimized priority queue level for the flow at each of the plurality of switches in the network; and
    sending, to each of the plurality of switches, information associated with the optimized priority queue level of the flow at each of the plurality of switches.

2. The method of claim 1, wherein the method comprises: configuring the plurality of switches based on the path and the optimized priority queue level for the flow, wherein at least two of the optimized priority queue levels are different.

3. The method of claim 1, wherein the method comprises: determining a span of the optimized priority queue level of the flow at each of the plurality of switches, wherein the span of the optimized priority queue level of the flow at each of the plurality of switches is a range between the lowest priority queue level of the flow and the highest priority queue level of the flow at each of the plurality of switches.

4. The method of claim 3, wherein the method comprises: assigning the optimized priority queue level of the flow at each of the plurality of switches based on an increasing order of spans of the plurality of switches for the flow, wherein the optimized priority queue level of the flow is assigned with a switch having a shortest span first and the optimized priority queue level of the flow is assigned with a switch having a highest span last in the increasing order of spans.

5. The method of claim 4, wherein the method comprises assigning the optimized priority queue level of the flow with each of the plurality of switches in the increasing order of spans using the highest priority queue level of the flow at each of the plurality of switches.

6. The method of claim 5, wherein the method comprises updating the priority queue levels of the one or more existing flows at the plurality of switches based on the QoS requirement of the flow in the network when the flow first enters the network, wherein the QoS requirement of the flow includes a bandwidth requirement of the flow and a delay requirement of the flow in the network.

7. The method of claim 6, wherein the method comprises: evaluating whether the bandwidth requirement of the flow on a link in the network is met using:

(C−R1)>R2, wherein C is a capacity of the link in the network, R1 is the bandwidth requirement of the flow in the network, and R2 is bandwidth requirements of the one or more existing flows on the link in the network, and wherein the delay requirement of the flow in the network is evaluated using:

Df=f(q, R1:q, C) and Sum(Df)<Ds, wherein Df is the delay experienced by the flow at a switch of the plurality of switches in the network, f is the flow, q is an optimized priority queue level of the flow in the switch, R1:q is a sum of bandwidth requirements of the flow and the one or more existing flows between a lowest priority queue level and a highest priority queue level of the switch, C is the capacity of the network, Sum(Df) is total of delays experienced by the flow at the plurality of switches in the network, and Ds is a specified delay requirement for the flow in the network.

8. The method of claim 6, wherein the method comprises updating the priority queue levels of the one or more existing flows at each of the plurality of switches relative to the optimized priority queue levels of the flow at each of the plurality of switches.

9. The method of claim 1, wherein the method comprises determining the optimized priority queue levels of the flow at the plurality of switches that maximize the QoS requirement for the flow and QoS requirements for the one or more existing flows in the network, wherein the optimized priority queue levels of the flow vary at each of the plurality of switches.

10. The method of claim 1, wherein the method comprises: aggregating different flows into at least one group based on flow specifications; and
allocating a QoS requirement for the at least one group of flows, wherein the at least one group of flows passes through the path based on the allocated QoS requirement for the at least one group of flows, wherein the path is determined based on an order of the plurality of switches in the path.

11. The method of claim 10 wherein the method comprises determining an optimized priority queue level of the at least one group of flows at each of the plurality of switches based on the allocated QoS requirement of the at least one group of flows, wherein the at least one group of flows passes through the plurality of switches in the path.

12. A controller configured to optimize priority queue levels for a flow in a network, the controller comprising:
a processor configured to:
determine a path for the flow, wherein the path comprises a plurality of switches;
determine an optimized priority queue level of the flow at each of the plurality of switches based on a QoS requirement of the flow and priority queue levels of one or more existing flows in the network, wherein to determine the optimized priority queue level of the flow at each of the plurality of switches comprises to determine a lowest priority queue level and a highest priority queue level of the flow at each of the plurality of switches, wherein the lowest priority queue level is a lowest priority queue level without violating the QoS requirements of the flow at each of the plurality of switches, and the highest priority queue level is a highest priority queue level without violating the QoS requirements of the one or more existing flows at each of the plurality of switches, and wherein the flow passes through the plurality of switches using the optimized priority queue level for the flow at each of the plurality of switches in the network; and
send, to each of the plurality of switches, information associated with the optimized priority queue level of the flow at each of the plurality of switches; and
a data storage device to store the path and the optimized priority queue level for the flow at each of the plurality of switches.

13. The controller of claim 12, wherein the processor configures the plurality of switches based on the path and the optimized priority queue level for the flow, wherein at least two of the optimized priority queue levels are different.

14. The controller of claim 12,
wherein the processor is configured to determine a span of the optimized priority queue level of the flow at each of the plurality of switches, wherein the span of the optimized priority queue level of the flow at each of the plurality of switches is in a range between the lowest priority queue level of the flow and the highest priority queue level of the flow at each of the plurality of switches.

15. The controller of claim 14, wherein the processor is configured to assign an optimized priority queue level of the flow at each of the plurality of switches based on an increasing order of spans of the plurality of switches for the flow.

16. The controller of claim 15, wherein the processor is configured to update the priority queue levels of the one or more existing flows at each of the plurality of switches relative to the optimized priority queue levels of the flow at each of the plurality of switches.

17. The controller of claim 12, wherein the processor is configured to determine the optimized priority queue levels of the flow at the plurality of switches that maximize the QoS requirement for the flow and QoS requirements for the one or more existing flows in the network.

18. The controller of claim 12, wherein the processor is configured to:
   aggregate different flows into at least one group based on flow specifications;
   allocate a QoS requirement for the at least one group of flows, wherein the at least one group of flows passes through the path based on the allocated QoS requirement for the at least one group of flows, wherein the path is determined based on an order of the plurality of switches in the path; and
   determine the optimized priority queue level of the at least one group of flows at each of the plurality of switches based on the allocated QoS requirement of the at least one group of flows, wherein the at least one group of flows passes through the plurality of switches in the path.

19. A non-transitory computer readable storage medium storing instructions thereon, the instructions executable by a processor to:
   determine a path for the flow, wherein the path includes the plurality of switches;
   determine an optimized priority queue level of the flow at each of the plurality of switches based on a QoS requirement of the flow and priority queue levels of one or more existing flows in the network, wherein to determine the optimized priority queue level of the flow at each of the plurality of switches comprises to determine a lowest priority queue level and a highest priority queue level of the flow at each of the plurality of switches, wherein the lowest priority queue level is a lowest priority queue level without violating the QoS requirements of the flow at each of the plurality of switches, and the highest priority queue level is a highest priority queue level without violating the QoS requirements of the one or more existing flows at each of the plurality of switches, and wherein the flow passes through the plurality of switches using the optimized priority queue level for the flow at each of the plurality of switches in the network; and
   send, to each of the plurality of switches, information associated with the optimized priority queue level of the flow at each of the plurality of switches.

* * * * *